United States Patent
Isayama

(10) Patent No.: US 7,401,953 B2
(45) Date of Patent: Jul. 22, 2008

(54) MOTORCYCLE

(75) Inventor: Hiroyuki Isayama, Samutprakam (TH)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 63 days.

(21) Appl. No.: 11/459,580

(22) Filed: Jul. 24, 2006

(65) Prior Publication Data
US 2007/0025114 A1 Feb. 1, 2007

(30) Foreign Application Priority Data
Jul. 25, 2005 (JP) .............................. 2005-213969

(51) Int. Cl.
*F21V 33/00* (2006.01)
(52) U.S. Cl. ..................... 362/474; 362/473; 362/475; 362/476; 296/78.1
(58) Field of Classification Search ......... 362/473–476, 362/544, 507, 538–539; D12/182; 296/78.1, 296/193.09
See application file for complete search history.

(56) References Cited

U.S. PATENT DOCUMENTS

| | | | | |
|---|---|---|---|---|
| 4,868,720 A | * | 9/1989 | Miyauchi et al. ............ | 362/466 |
| 6,390,656 B1 | * | 5/2002 | Suda et al. .................. | 362/475 |
| 2005/0174787 A1 | * | 8/2005 | Uemoto et al. .............. | 362/473 |
| 2006/0181891 A1 | * | 8/2006 | Surawichai et al. ......... | 362/474 |
| 2006/0193143 A1 | * | 8/2006 | Ohira ........................ | 362/473 |

FOREIGN PATENT DOCUMENTS

JP 2004-322827 11/2004

\* cited by examiner

*Primary Examiner*—John A. Ward
*Assistant Examiner*—Robert May
(74) *Attorney, Agent, or Firm*—Hogan & Hartson LLP

(57) ABSTRACT

A motorcycle wherein it is possible to easily identify the state of a headlight and flasher lamps covered with a common outer lens. A a headlight is disposed in a central portion of a light unit in a transverse direction of the motorcycle. A pair of left and right flasher lamps is disposed on left and right sides of the headlight. A common outer lens covers the left and right flasher lamps and the headlight. An upper edge of a light opening in a handlebar cover has left and right interposed parts extending downward to be interposed between the headlight and the left and right flasher lamps.

14 Claims, 7 Drawing Sheets

MOTORCYCLE

RELATED APPLICATIONS

This application claims the benefit of priority under 35 USC 119 of Japanese patent application no. 2005-218969, filed on Jul. 25, 2005, which application is hereby incorporated by reference in its entirety.

BACKGROUND OF THE INVENTION

1. Field of the Invention

The present invention relates to a motorcycle having a handlebar cover that encloses the steering handlebars, and a light unit mounted to the handlebar cover.

2. Description of Related Art

Some motorcycles have a light unit disposed on a handlebar cover that encloses steering handlebars. Some conventional light units have a headlight disposed in the central portion in the transverse direction of the motorcycle, left and right flasher lamps disposed on the left and right sides of the headlight, and a common outer lens covering the front portions of the headlight and flasher lamps (see JP-A-2004-322827, for example).

In such conventional light units where the headlight and the left and right flasher lamps are covered with a common outer lens, it is sometimes hard to identify the state of the headlight and the flasher lamps being lit, resulting in a need for improvement in visibility.

SUMMARY OF THE INVENTION

In view of the foregoing problem, it is an object of the present invention to provide a motorcycle where the state of the headlight and the flasher lamps covered with the common outer lens being lit is easily identified.

The present invention is directed to a motorcycle having a steering handlebar. A handlebar cover encloses the steering handlebar. A light unit is mounted to a peripheral edge of a light opening in the handlebar cover. A headlight is disposed in the central portion of the light unit in a transverse direction of the motorcycle. A pair of left and right flasher lamps is disposed on left and right sides of the headlight. A common outer lens covers the left and right flasher lamps and the headlight. An upper edge of the light opening of the handlebar cover has left and right interposed parts extending downward to be interposed between the headlight and the left and right flasher lamps.

According to the invention, the upper edge of the light opening of the handlebar cover has interposed parts extending downward to be interposed between the headlight and the flasher lamps. This gives the appearance that the headlight and the flasher lamps are separated by the interposed parts, while still using a common outer lens. It is thus possible to easily identify the state of the headlight and the flasher lamps being lit, thereby providing improved visibility.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
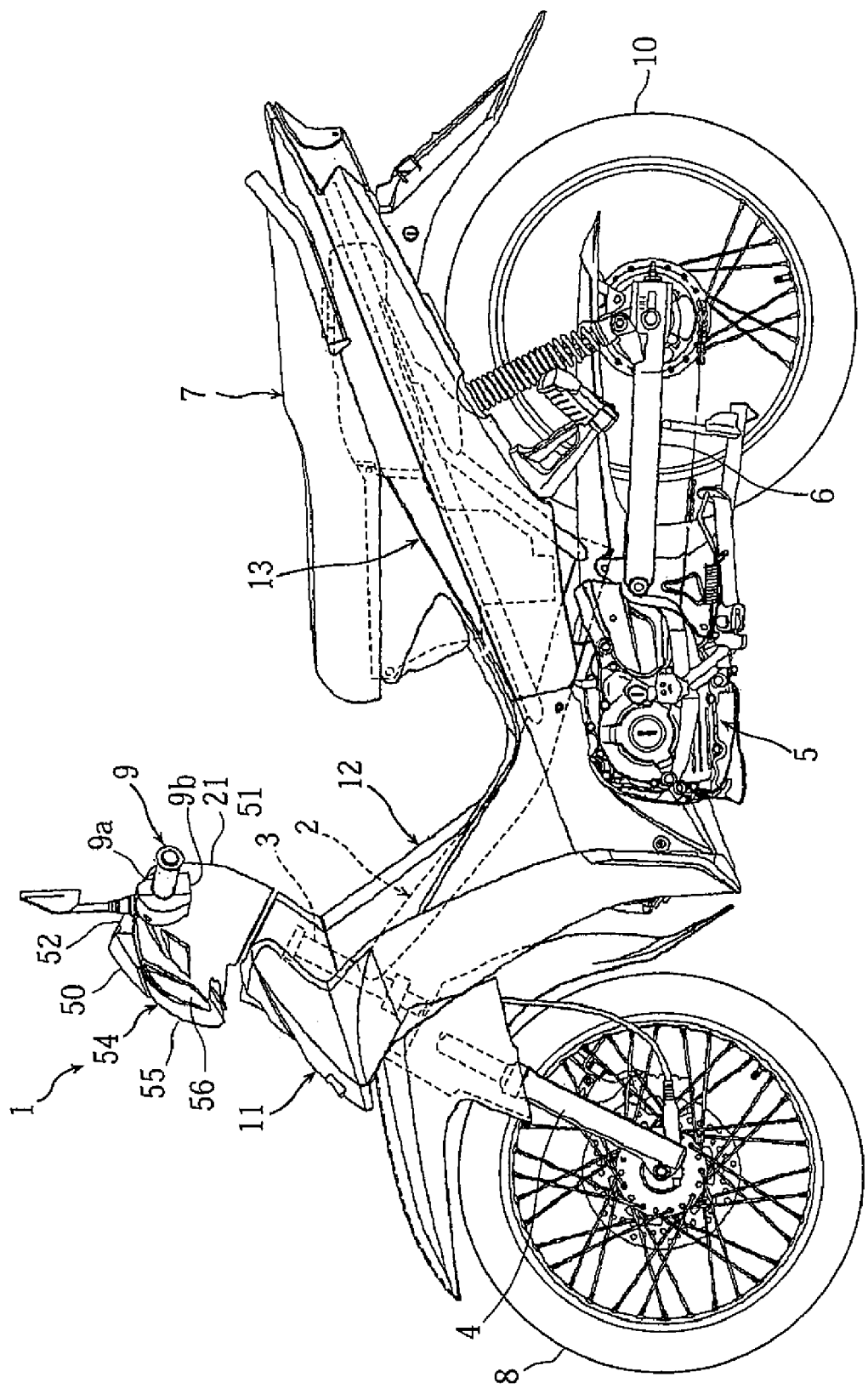
FIG. 1 is a side view of a motorcycle according to an embodiment of the present invention.

An embodiment of the present invention is described hereinafter with reference to the attached drawings.

FIGS. 1-7 are explanatory views of a motorcycle in accordance with an embodiment of the present invention. In the following description and claims, the terms "right," "left," "front" and "rear" mean right, left, front and rear sides from the perspective of a rider seated in the seat.

In the drawings, reference numeral 1 denotes a motorcycle. The motorcycle 1 includes an underbone type body frame 2; a head pipe 3 fixed to the front end of the body frame 2; a front fork 4 pivotally supported with the head pipe 3 for left-and-right steering movement; an engine unit 5 suspended from and supported by the central portion of the body frame 2; a rear arm 6 pivotally supported therewith for up-and-down pivotal movement; and a seat 7 for two persons mounted on the upper rear portion of the body frame 2.

A front wheel 8 is rotatably supported at the lower end of the front fork 4. Steering handlebars 9 are fixed at the upper end of the front fork 4. A rear wheel 10 is rotatably supported at the rear end of the rear arm 6.

The front side of the head pipe 3 of the body frame 2 is covered with a front cover 11, and the rear side with a leg shield 12. A portion of the body frame 2 below the periphery of the seat 7 is covered with a side cover 13.

The periphery of the steering handlebars 9 is covered with a handlebar cover 21 made of resin material. The handlebar cover 21 covers the center portion of the steering handlebars 9 in the vehicle width direction so that right and left grips 9a, 9a and right and left switch boxes 9b, 9b of the steering handlebars 9 can be exposed to the outside.

The handlebar cover 21 is separated into a front cover half 50 and a rear cover half 51. The front and rear cover halves 50, 51 are fitted and fixed to each other with their mating faces joined to each other, and then fixedly attached to the steering handlebars 9.

Figure 5:
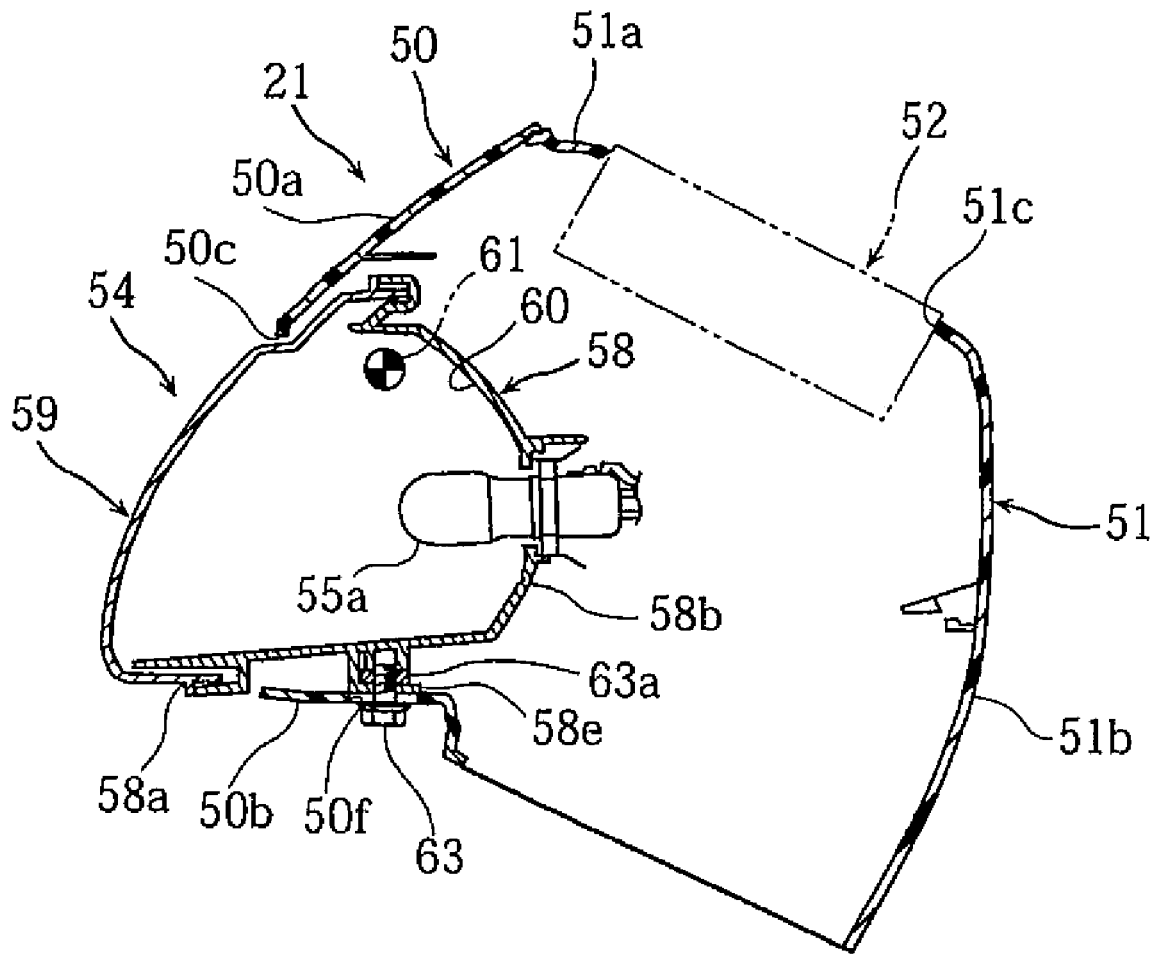
FIG. 5 is a sectional view of the light unit along line V-V in FIG. 3.
Figure 6:
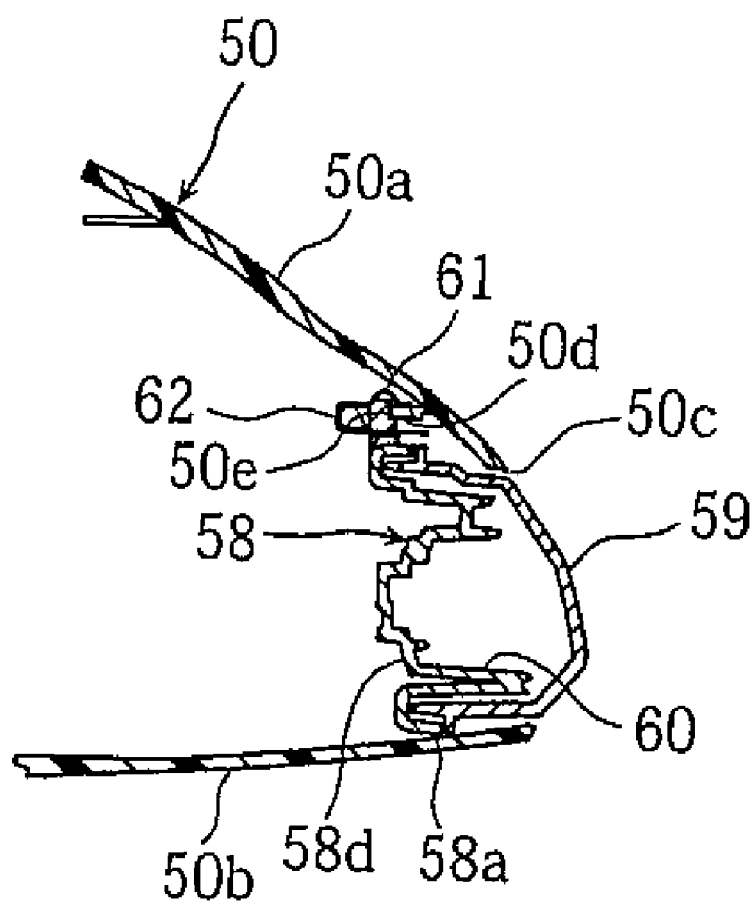
FIG. 6 is a sectional view of the light unit along line VI-VI in FIG. 3.
Figure 7:
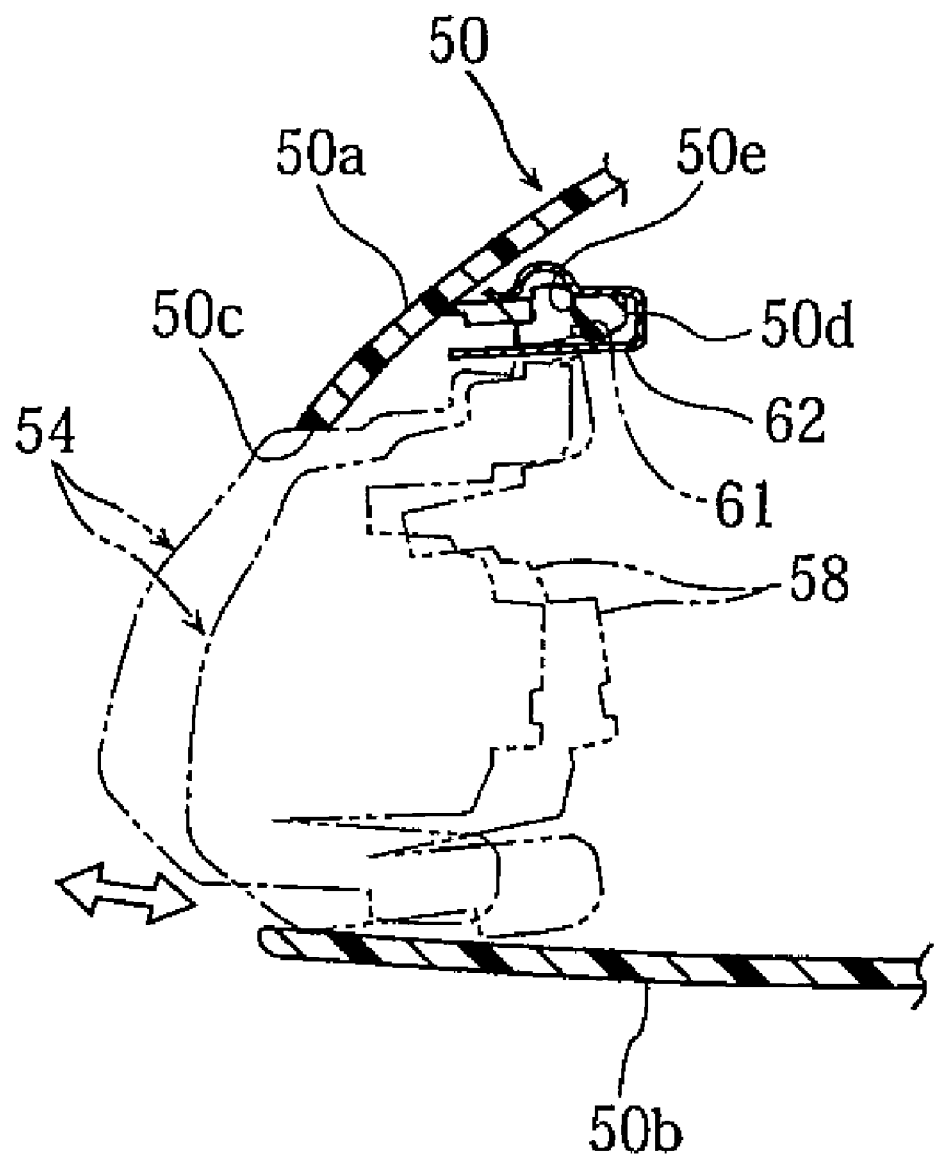
FIG. 7 is a sectional view illustrating a state where the light unit vertically pivots.

The rear cover half 51 has an upper wall portion 51a for covering the upper portion of the steering handlebars 9, and a rear wall portion 51b extending continuously from the rear edge of the upper wall portion 51a for covering the rear portion of the steering handlebars 9 (FIG. 5). The upper wall portion 51a has a meter mounting opening 51c, in which a meter device 52 is mounted.

Figure 4:
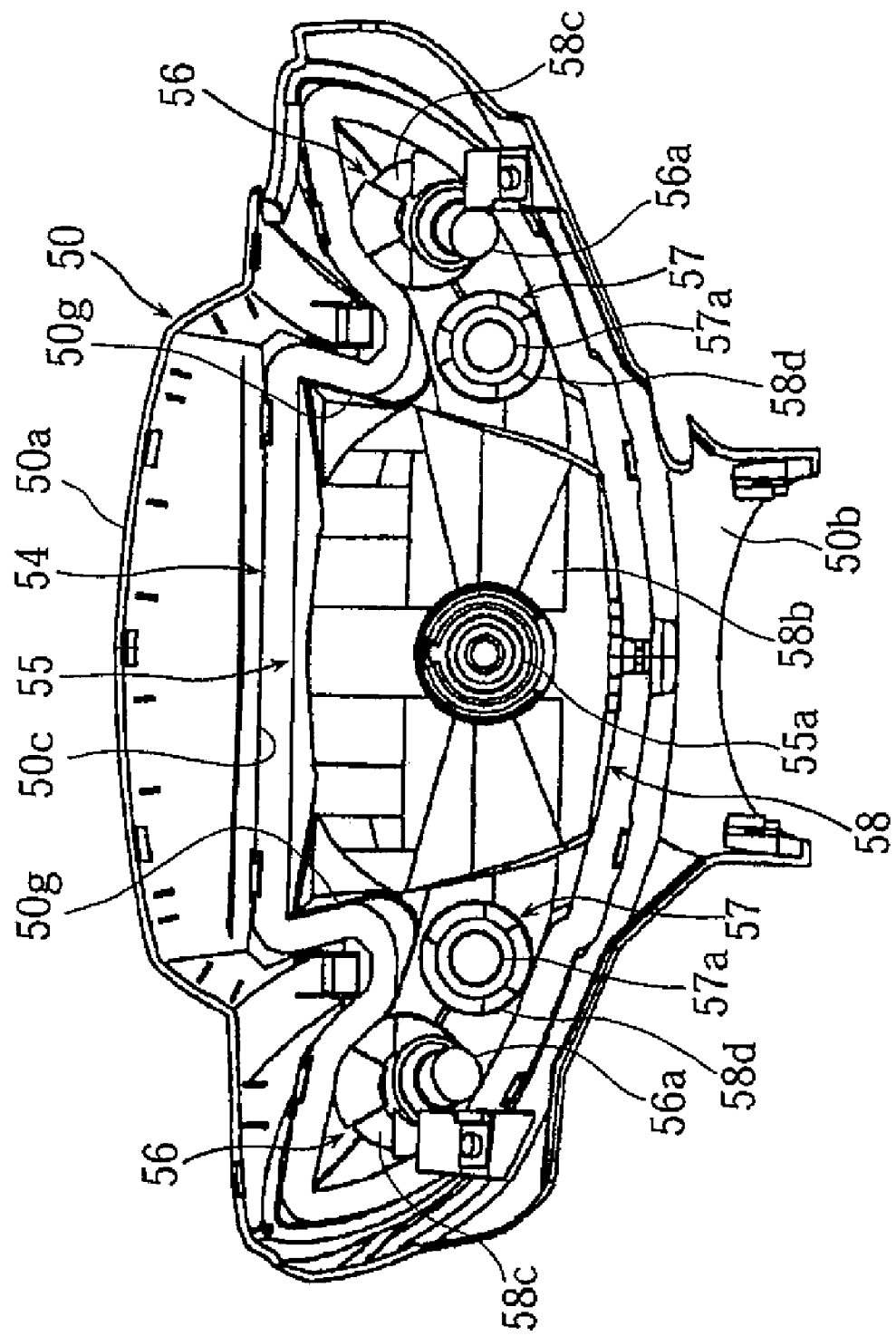
FIG. 4 is a rear view of the light unit, illustrating a state of a rear cover half being removed.

The front cover half 50 has a front wall portion 50a fitted to the front edge of the upper wall portion 51a for covering the front portion of the steering handlebars 9, and a bottom wall portion 50b extending from the lower edge of the front wall portion 50a backward for covering the lower portion of the steering handlebars 9. FIG. 4 is the rear view of the front cover half 50, illustrating the state of the rear cover half being removed, as seen from the rear.

The front wall portion 50a of the front cover half 50 has a light opening 50c extending across the front wall portion in the transverse direction of the vehicle, in which a light unit 54 is mounted. The light unit 54 is in a generally semicircular shape, having the lower edge in an arcuate shape and the upper edge generally linear, as seen from the front side of the vehicle.

The light unit 54 has a unitized structure of a unitary headlight 55 disposed in the central portion in the transverse direction of the vehicle; a pair of left and right flasher lamps 56, 56 disposed on the left and right sides of the headlight 55; and a pair of left and right position lamps 57, 57 disposed between the headlight 55 and the left and right flasher lamps 56 (FIG. 4). The position lamps 57 are designed to be lit separately from the headlight 55 and the flasher lamps 56.

The light unit 54 has a housing 58 having generally dome-shaped cross sections and having a lens opening 58a that is open forward, and an outer lens 59 fitted and fixed to the lens opening 58a of the housing 58 (FIG. 5). The outer lens 59 and the housing 58 are for common use among the headlight 55, the left and right flasher lamps 56, and the left and right position lamps 56.

To a transverse central bottom part 58b of the housing 58, a lamp bulb 55a of the head light 55 is removably attached, and to left and right bottom parts 58c, 58c on both sides of the central bottom part 58b, lamp bulbs 56a, 56a of the left and right flasher lamps 56, 56 removably attached. To left and right middle bottom parts 58d, 58d between the headlight 55 and the left and right flasher lamps 56, lamp bulbs 57a, 57a of the left and right position lamps 57, 57 are removably attached.

The inner surface of the bottom parts 58b to 58d of the housing 58 is coated with a reflector material 60 for reflecting the light from the lamp bulbs 55a to 57a to the outer lens 59.

The inner face of the front wall portion 50a of the front cover half 50 has a pair of left and right boss parts 50d, 50d extending generally horizontally rearward. The boss parts 50d have support holes 50e. The upper wall portion of the housing 58 has a pair of left and right aiming pivot shafts 61, 61 formed to project upward. The aiming pivot shaft 61 is inserted through the support hole 50e, and pivotally supported with a leaf spring 62. The vertical pivotal movement of the light unit 54 about the left and right pivot shafts 61, 61 causes a simultaneous change in the angles of the optical axes of the lamp bulbs 55a to 57a (see FIG. 7).

A slot 50f extending in the longitudinal direction is formed at the center in the vehicle width direction of the bottom wall portion 50b of the front cover half 50 (FIG. 5). The housing 58 has an integral fixing lug 58e contacting the upper face of the bottom wall portion 50b to cover the slot 50f. An aiming bolt 63 is inserted through the slot 50f from downward, and fitted in a nut 63a that is disposed on the fixing lug 58e.

Adjustment to the optical axes of the light unit 54 are made by loosening the aiming bolt 63 to allow the entire light unit 54 to pivot vertically about the left and right pivot shafts 61, 61, and then tightening the aiming bolt 63 to fix the light unit 54 to a certain optical-axis angle position.

Figure 3:
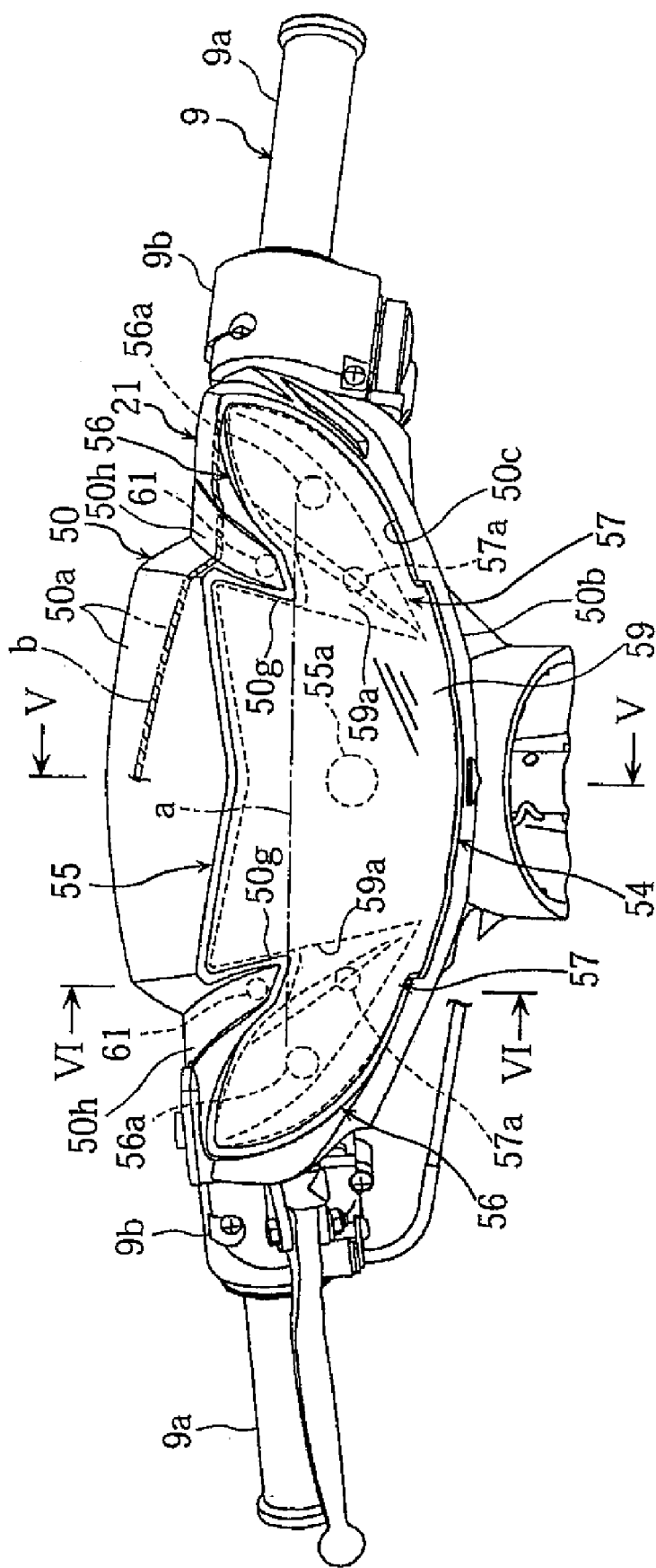
FIG. 3 is a front view of a light unit mounted to the handlebar cover.

As seen from the front side of the vehicle, the upper edge of the light opening 50c of the front cover half 50 has integral left and right interposed parts 50g, 50g extending downward to be interposed between the headlight 55 and the left and right flasher lamps 56, 56 (FIG. 3).

The lower ends of the left and right interposed parts 50g are positioned slightly below a straight line "a" that connects the upper edges of the lamp bulbs 56a of the left and right flasher lamps 56. The lamp bulbs 55a and 57a of the headlight 55 and the left and right position lamps 57 are positioned below the straight line "a" and at generally the same height.

The left and right interposed parts 50g are formed to extend in the to-and-fro direction continuously from the front wall portion 50a of the front cover half 50, and a portion of the front wall portion 50a that faces the interposed parts 50g is formed in a stepped-down manner to be lower in height than the left and right sides thereof. A chain double-dashed line "b" in FIG. 3 shows the shape of a section of the front wall portion 50a.

More specifically, a part of the front wall portion 50a that faces the left and right edges of the headlight 55 has groove-like stepped-down parts 50h extending in the to-and-fro direction. The stepped-down part 50h extends from the rear end of the front wall portion 50a forward to be slightly inclined inwardly. The interposed part 50g is formed in the shape of a surface continuous with the stepped-down part 50h.

Figure 2:
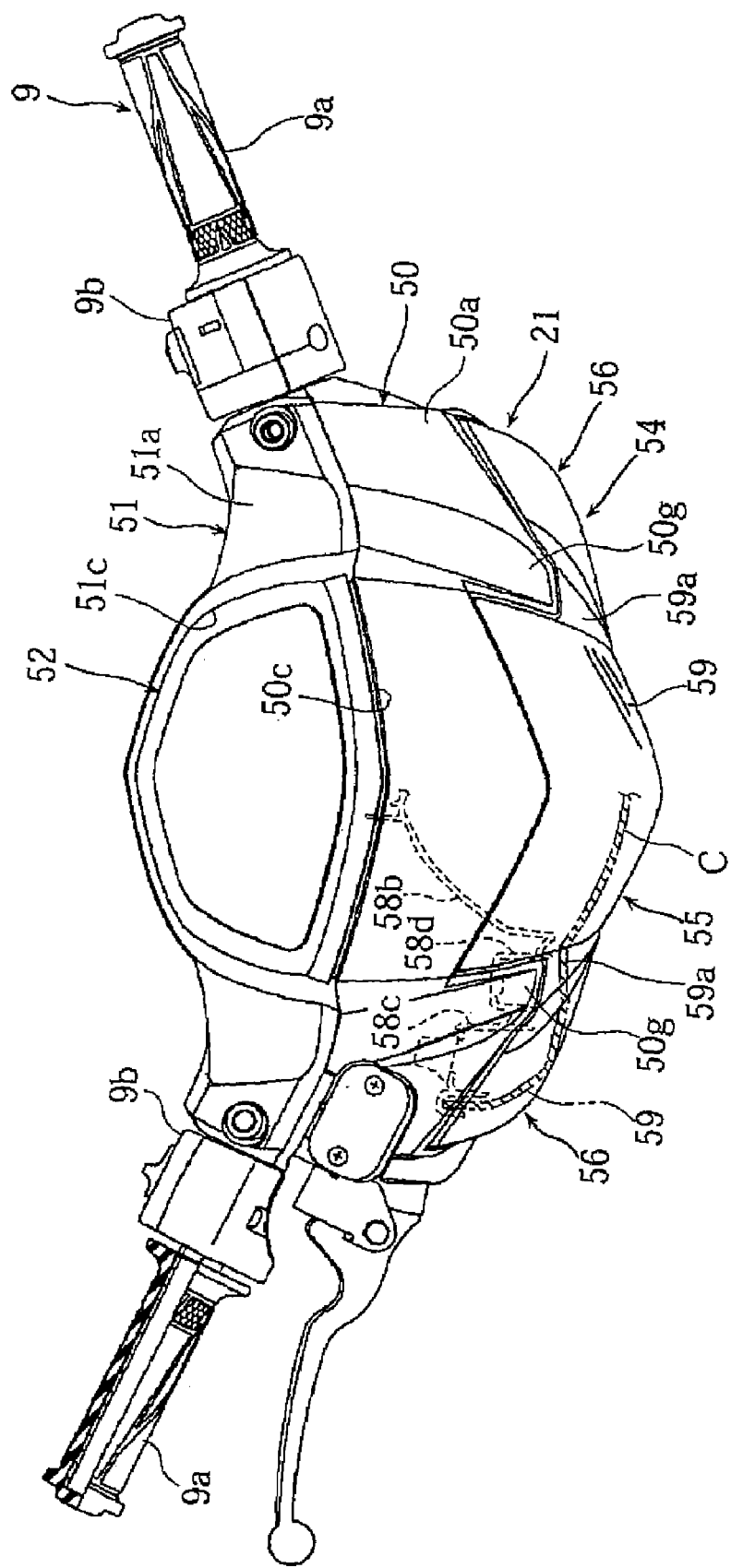
FIG. 2 is a plan view of a handlebar cover of the motorcycle.

A portion of the outer lens 59 that faces the headlight 55, and a portion that faces the left and right flasher lamps 56, 56 are formed to be protruded forward in a generally globe shape. A portion of the outer lens 59 that faces the left and right interposed parts 50g between the headlight 55 and the left and right flasher lamps 56, 56 has recesses 59a formed in a stepped-down manner to be continuous with the interposed parts 50g. The recess 59a tapers from the interposed part 50g downward. A chain double-dashed line "c" in FIG. 2 shows the shape of a section of the outer lens 59.

As seen from the front side of the vehicle, the aiming pivot shafts 61 are disposed within the plane of projection of the left and right interposed parts 50g rearward of the vehicle (FIG. 3). The aiming pivot shafts 61 are thus hidden behind the interposed parts 50g. The position lamps 57 are disposed below the left and right interposed parts 50g and between the headlight 55 and the left and right flasher lamps 56.

In this embodiment, the upper edge of the light opening 50c of the handlebar cover 21 enclosing the steering handlebars 9 has the interposed parts 50g extending downward to be interposed between the headlight 55 and the left and right flasher lamps 56. This gives the appearance that the headlight 55 and the left and right flasher lamps 56 are separated by the interposed parts 50g, while still using the common outer lens 59. It is thus possible to easily identify the state of the headlight 55 and the left and right flasher lamps 56 being lit, providing improved visibility.

The lower ends of the left and right interposed parts 50g are positioned below the straight line "a" that connects the upper edges of the lamp bulbs 56a of the left and right flasher lamps 56. This allows more reliable identification of the state of the headlight 55 and the flasher lamps 56 being lit, without worsening the appearance of the unitary outer lens 59.

In this embodiment, the left and right aiming pivot shafts 61 for supporting the light unit 54 for up-and-down pivotal movement are disposed within the plane of projection of the left and right interposed parts 50g, thereby decreasing the amount of displacement of the light unit 54 for vertical pivotal movement about the aiming pivot shafts 61. This can reduce a gap between the light unit 54 and the bottom wall portion 50b of the front cover half 50 for optical-axis adjustment, preventing worsening of appearance.

In this embodiment, a portion of the front wall portion 50a of the front cover half 50 that is continuous with the left and right interposed parts 50g has the stepped-down part 50h, thereby increasing the rigidity of the front cover half 50 itself, as well as improving the appearance.

In this embodiment, a portion of the outer lens 59 that faces the left and right interposed parts 50g has the recesses 59a formed to be continuous with the interposed parts 50g, thereby increasing the rigidity of the outer lens 59, as well as improving the appearance.

As seen from the front side of the vehicle, the stepped-down part 50h, interposed part 50g, and recess 59a extend from the rear end of the front wall portion 50a toward the lower end of the outer lens 59 in the shape of a continuous surface, providing a new design not seen before.

In this embodiment, the position lamps 57 are disposed below the left and right interposed parts 50g and between the headlight 55 and the left and right flasher lamps 56. The position lamps 57 thereby maximize the space available between the headlight 55 and the flasher lamps 56 and below the interposed parts 50g, avoiding an increase in the size of the light unit 54.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a steering handlebar;
   a handlebar cover enclosing the steering handlebar; and
   a light unit mounted to a peripheral edge of a light opening in the handlebar cover, the light unit comprising a headlight disposed in a central portion in a transverse direction of the motorcycle; a pair of left and right flasher lamps disposed on left and right sides of the headlight; and a common outer lens covering the left and right flasher lamps and the headlight, wherein an upper edge of the light opening of the handlebar cover has left and right interposed parts extending downward to be interposed between the headlight and the left and right flasher lamps.

2. The motorcycle according to claim 1, wherein lower ends of the left and right interposed parts are positioned below a straight line that connects upper edges of lamp bulbs of the left and right flasher lamps.

3. The motorcycle according to claim 1, wherein the light unit is supported on the handlebar cover by an aiming pivot shaft for vertical angle adjustment, and the aiming pivot shaft is disposed rearward of and within the plane of projection of the interposed parts.

4. The motorcycle according to claim 1, wherein the left and right interposed parts of the handlebar cover are formed in a stepped-down manner to be lower in height than adjacent parts of the handlebar cover.

5. The motorcycle according to claim 4, wherein a portion of the outer lens that faces the interposed parts is formed in a stepped-down manner and is generally continuous with the interposed parts.

6. The motorcycle according to claim 2, wherein the light unit further comprises left and right position lamps disposed below the left and right interposed parts and between the headlight and the flasher lamps, wherein front portions of the left and right position lamps are covered with the outer lens.

7. The motorcycle according to claim 6, wherein lamp bulbs of the headlight and the left and right position lamps are positioned below the straight line that connects the upper edges of the lamp bulbs of the left and right flasher lamps, and at approximately the same height.

8. A handlebar cover for a motorcycle comprising:
   a light opening formed in the cover;
   a light unit mounted to a peripheral edge of the light opening, the light unit comprising a headlight; flasher lamps disposed on opposite sides of the headlight; and a common outer lens covering the flasher lamps and the headlight; and
   interposed parts extending downward from an upper edge of the light opening to be interposed between the headlight and the flasher lamps.

9. The handlebar cover according to claim 8, wherein lower ends of the interposed parts are positioned below a straight line that connects upper edges of the flasher lamps.

10. The motorcycle according to claim 8, wherein the light unit is supported on the handlebar cover by an aiming pivot shaft for vertical angle adjustment, and the aiming pivot shaft is disposed rearward of and within the plane of projection of the interposed parts.

11. The motorcycle according to claim 8, wherein the interposed parts are formed in a stepped-down manner relative to adjacent parts of the handlebar cover.

12. The motorcycle according to claim 11, wherein a portion of the outer lens that faces the interposed parts is formed in a stepped-down manner and is generally continuous with the interposed parts.

13. The motorcycle according to claim 9, wherein the light unit further comprises position lamps disposed below the interposed parts and between the headlight and the flasher lamps and being covered by the outer lens.

14. The motorcycle according to claim 13, wherein the headlight and the position lamps are positioned below the straight line that connects the upper edges of the flasher lamps, and at approximately the same height.

* * * * *